(12) United States Patent
Yan et al.

(10) Patent No.: US 11,711,717 B2
(45) Date of Patent: *Jul. 25, 2023

(54) MOBILE NETWORK CONDITIONAL POLICY EXECUTION BASED ON UE GEOGRAPHIC LOCATION

(71) Applicant: Verizon Patent and Licensing Inc., Basking Ridge, NJ (US)

(72) Inventors: Lixia Yan, Basking Ridge, NJ (US); James Mathison, Warren, NJ (US); Marc Chiaverini, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,278

(22) Filed: May 3, 2022

(65) Prior Publication Data
US 2022/0264353 A1    Aug. 18, 2022

Related U.S. Application Data

(63) Continuation of application No. 17/001,846, filed on Aug. 25, 2020, now Pat. No. 11,350,303.

(51) Int. Cl.
*H04W 28/02* (2009.01)
*H04W 28/08* (2023.01)

(52) U.S. Cl.
CPC ... *H04W 28/0226* (2013.01); *H04W 28/0925* (2020.05); *H04W 28/0967* (2020.05)

(58) Field of Classification Search
CPC ... H04W 48/06; H04W 8/08; H04W 28/0268; H04W 24/08; H04W 4/40; H04W 24/10; H04W 80/10; H04W 28/0226; H04W 4/24; H04W 72/08; H04W 8/06; H04M 15/66; H04M 15/83; H04M 15/84; H04M 15/85; H04M 15/863; H04M 15/8228; H04M 15/8016; H04L 12/1407; H04L 65/1026; H04L 67/38; H04L 67/327; H04L 67/141; H04L 65/1063; H04L 29/08; H04L 29/06

See application file for complete search history.

(56) References Cited

U.S. PATENT DOCUMENTS

| | | | |
|---|---|---|---|
| 2018/0192390 A1* | 7/2018 | Li | H04W 80/10 |
| 2018/0192471 A1* | 7/2018 | Li | H04W 72/0493 |
| 2018/0317157 A1* | 11/2018 | Baek | H04W 48/18 |
| 2019/0007992 A1* | 1/2019 | Kim | H04W 76/27 |
| 2019/0116486 A1* | 4/2019 | Kim | H04W 8/10 |
| 2019/0158408 A1* | 5/2019 | Li | H04L 67/104 |
| 2019/0261260 A1* | 8/2019 | Dao | H04W 48/18 |
| 2019/0357301 A1* | 11/2019 | Li | H04W 80/10 |
| 2019/0394279 A1* | 12/2019 | Dao | H04W 40/02 |
| 2020/0112907 A1* | 4/2020 | Dao | H04M 15/84 |
| 2020/0374323 A1* | 11/2020 | Zhang | H04L 65/1063 |
| 2021/0099870 A1* | 4/2021 | Moon | H04W 12/06 |
| 2021/0120596 A1* | 4/2021 | Youn | H04W 76/12 |
| 2021/0212021 A1* | 7/2021 | Youn | H04W 60/00 |
| 2021/0274387 A1* | 9/2021 | Kousaridas | H04L 43/091 |

* cited by examiner

*Primary Examiner* — Jung Liu

(57) ABSTRACT

A network device receives, from a policy control function (PCF), at least one set of multiple user equipment device (UE)-location based conditional policy rules. The network device selects a first one of the multiple UE-location based conditional policy rules based on a first geographic location of a first UE, and controls data traffic associated with the first UE using the selected first one of the plurality of UE-location based conditional policy rules.

20 Claims, 6 Drawing Sheets ative). Selection of a MEC
MOBILE NETWORK CONDITIONAL POLICY EXECUTION BASED ON UE GEOGRAPHIC LOCATION

CROSS-REFERENCE TO RELATED APPLICATION

The present application is a continuation of, and claims priority to, U.S. application Ser. No. 17/001,846 entitled "Mobile Network Conditional Policy Execution Based on UE Geographic Location," filed Aug. 25, 2020, the content of which is incorporated by reference herein in its entirety.

BACKGROUND

Edge computing may involve a cloud-based Information Technology (IT) service environment located at an edge of a network. One of the purposes of edge computing is to enable high-bandwidth, low-latency access to latency-sensitive applications distributed at the edge of the network closest to the user. A primary goal of edge computing is to reduce network congestion and improve application performance by executing task processing closer to end users thereby improving the delivery of content and applications to the end users and reducing transport costs for high bandwidth services. Applications where edge computing is highly desirable may include on-line gaming, augmented reality (AR), virtual reality (VR), wirelessly connected vehicles, and Internet of Things (IoT) applications (e.g., industry 4.0 applications). Additionally, edge computing can be beneficial in large public venues and enterprise organizations where services are delivered to onsite consumers from an edge server located at or near the venue or organization. In such large-scale use cases, data content may be locally produced, stored, processed, and/or delivered from an edge server, thus, ensuring reduced backhaul, low latency, or even ultra-low latency. Multi-Access Edge Computing (MEC) is one type of edge computing. MEC moves the processing, storing, and/or delivery of traffic and services from a centralized network to a data center(s) at the edge of the network, closer to the end user.

DETAILED DESCRIPTION OF THE PREFERRED EMBODIMENTS

Figure 1:
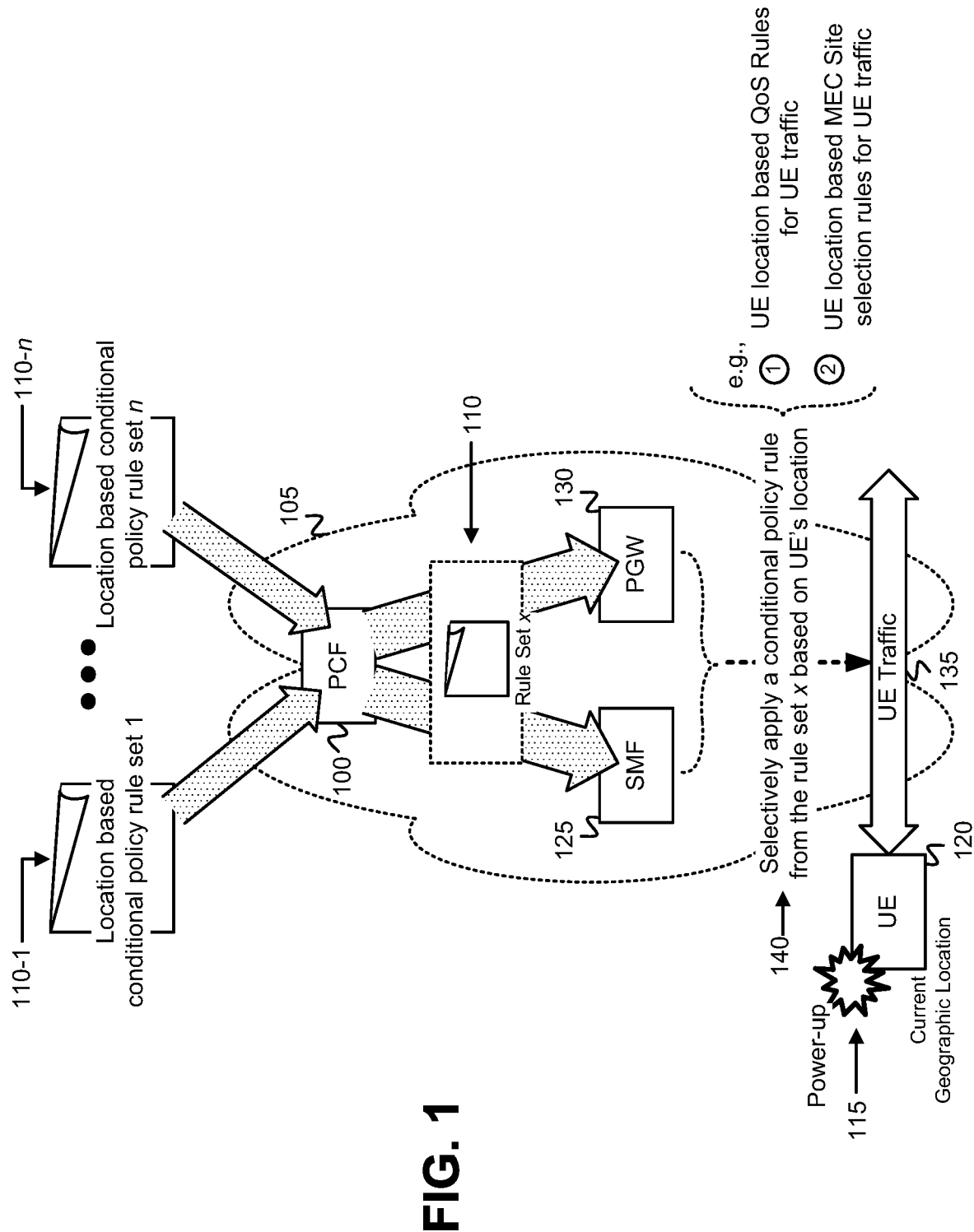
FIG. 1 illustrates an overview of the provision and use of location-based conditional policy rules for controlling traffic associated with UEs in a wireless network.

The following detailed description refers to the accompanying drawings. The same reference numbers in different drawings may identify the same or similar elements. The following detailed description does not limit the invention.

In existing networks, such as Fifth Generation networks, the Policy Control Function (PCF) updates network Quality of Service (QoS) Policy rules based on the Presence Reporting Area (PRA) within which a user equipment device (referred to herein as a "UE" or "UEs") is currently located. When the UE is in a Fourth Generation (4G)-only network coverage area, the PCF installs, at a Packet Data Network (PDN) Gateway (PGW), 4G QoS policy rules and when the UE is in a 5G network coverage area, the PCF installs, at a Session Management Function (SMF), 5G QoS policy rules. Currently, the SMF or PGW sends a message to the PCF each time the UE moves from one coverage area type to another, and the PCF updates the QoS policy rules at the SMF or the PGW upon receipt of the message. With the use of millimeter (mm) wave spectrum in 5G networks, these transitions between coverage area types (e.g., 4G to 5G, 5G to 4G) occur frequently, and the messaging traffic volume between the SMF/PGW and the PCF can become quite large.

With exemplary embodiments described herein, the PCF pre-loads a set of policy rules to the SMF or PGW, where the set of policy rules includes geographic conditions under which the SMF/PGW applies the policy rules. The SMF/PGW can then automatically apply the pre-loaded policy rules based on the UE's current geographic location, without having to exchange messages with the PCF during network transitions (e.g., 4G to 5G, 5G to 4G) of the UEs. Exemplary embodiments described herein, therefore, significantly reduce messaging traffic between the PCF and the SMF/PGW due to UE movement.

Exemplary embodiments described herein enable conditional policy execution in a wireless network based on a geographic location of UEs. As described herein, PCFs of the wireless network may specify a set of policy rules that can be supplied to the SMFs or PGWs for conditional execution based on a current geographic location of the UEs being handled by the SMFs of PGWs. In some implementations, the conditional policy rules may include Quality of Service (QoS) rules that may be applied by the SMFs/PGWs to control the QoS level of the UE traffic transported across the wireless network. In further implementations, the conditional policy rules may include MEC data center (also referred to herein as a "MEC") selection rules that may be applied by the SMFs/PGWs to select a particular MEC, of multiple MECs, that may process and handle traffic from particular UEs (i.e., selection of a particular MEC to which traffic for a given UE may be offloaded). Selection of a MEC for UE traffic offloading, using the conditional MEC selection policy rules, enables the improvement of certain QoS parameters associated with UE traffic (e.g., reduces latency) and reduces a volume of messaging traffic between the PCF and the SMF/PGW thereby improving the efficiency of the MEC traffic offloading.

FIG. 1 illustrates an overview of the provision and use of location based conditional policy rules for controlling traffic in a wireless network. As shown, a PCF 100 in a wireless network 105 receives location based conditional policy rule sets 110-1 through 110-*n* (where n is greater than or equal to 1). Each of the conditional policy rule sets 110-1 through 110-*n* includes a set of multiple conditional policy rules for controlling traffic associated with a UE or UEs. A network operator or network administrator of wireless network 105 may generate and supply the conditional policy rule sets 110-1 through 110-*n* to PCF 100, and PCF 100 may locally store the received conditional policy rule sets 110-1 through 110-*n*. In some embodiments, the conditional policy rule sets 110-1 through 110-*n* may be generated specifically for a particular UE/subscriber. Therefore, in these embodiments, different conditional policy rule sets 110-1 through 110-$n$ may be generated for different UEs/subscribers. In other embodiments, the conditional policy rule sets 110-1 through 110-$n$ may be generated for a particular group of UEs/subscribers. In these embodiments, different conditional policy rule sets 110-1 through 110-$n$ may be generated for each different group of UEs/subscribers. Each group of UEs/subscribers may have, for example, a same level of network subscription, be located in a same geographic area of the wireless network 105, be a same type or model of UE, etc.

Upon power-up 115 of a UE 120, PCF 100 retrieves a conditional policy rule set 110, from sets 110-1 through 110-$n$, for that particular UE/subscriber (or a group of UEs/subscribers to which the UE 120 belongs), and sends the conditional policy rule set 110 (generically referred to herein as a "policy rule set 110" or "policy rule sets 110") to a Session Management Function (SMF) 125 and/or a Packet Data Network (PDN) Gateway (PGW) 130 in wireless network 105 that is handling the UE 120. SMF 125 performs session management and selects and controls particular nodes (e.g., User Plane Functions (UPFs)) for data transport, including applying a policy rule from the policy rule sets 110. PGW 245 routes session traffic between UEs and source/destination nodes. In one implementation, the conditional policy rule set 110 may include UE location-based Quality of Service (QoS) rules for UE traffic. In this implementation, SMF 125 or PGW 130 selectively applies a QoS policy rule, from among multiple policy rules, to traffic to and from the UE based on the UE 120's current geographic location. In another implementation, the conditional policy rule set 110 may include MEC site selection rules for UE traffic. In this implementation, SMF 125 or PGW 130 selectively applies a policy rule, from among multiple policy rules, that further selects a MEC data center for handling the UE 120's traffic based on the UE 120's current geographic location.

Subsequent to being pre-loaded with a policy rule set 110, SMF 125 or PGW 130 obtains information that identifies a current geographic location of the UE 120 and then selectively applies 140 a conditional policy rule of the conditional policy rule set 110, based on the UE 120's current geographic location, to control the UE 120's traffic 135 over wireless network 105. As a simplified example, conditional policy rule sets 110 may include a single set of QoS policies having two policy rules: 1) policy rule #1-if the UE 120 is currently located in a 4G only coverage area, then PGW 130 restricts the UE 120 to data transport at a first QoS level (e.g., video streaming with a first, lower video resolution, such as 720p); or 2) policy rule #2-if the UE 120 is currently located in a 5G coverage area, then SMF 125 enables the UE 120 to engage in data transport at a second QoS level (e.g., video streaming with a second, higher video resolution, such as 4K). As another simplified example, conditional policy rule sets 110 may include a single set of MEC site selection policies having two or more policy rules: 1) policy rule #1—if the UE 120 is currently located in geographic region $x_1$, then SMF 125 or PGW 130 selects MEC 1 for handling UE traffic to/from the UE 120; 2) policy rule #2—if the UE 120 is currently located in geographic region $x_2$, then SMF 125 or PGW 130 selects MEC 2 for handling traffic to/from the UE 120; or 3) policy rule #z—if the UE 120 is currently located in geographic region $x_z$, then SMF 125 or PGW 130 selects MEC z for handling traffic to/from the UE 120. The conditional policy rules of conditional policy rule sets 110 may each include any type of conditional rule that controls, or applies a network function or action to, traffic to/from a UE 120 based on the UE 120's geographic location.

Figure 2:
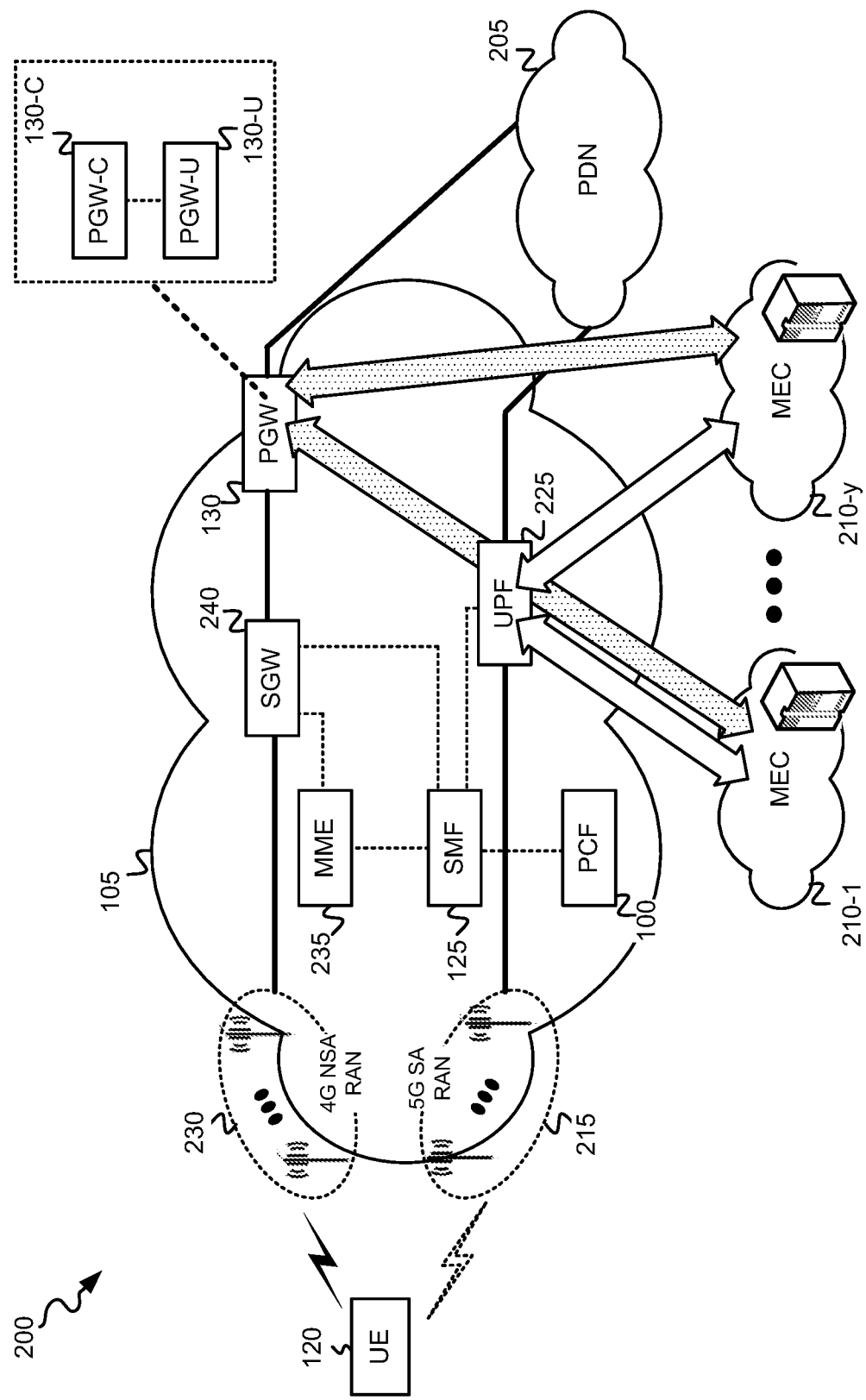
FIG. 2 illustrates an exemplary network environment in which conditional policies, based on user equipment device (UE) geographic location, are executed to control traffic within a mobile network.

FIG. 2 illustrates an exemplary network environment 200 in which conditional policies, based on UE geographic location, are executed to control UE traffic within the mobile network 105. As shown, network environment 200 includes a wireless network 105, a Packet Data Network (PDN) 205, multiple MEC data centers 210-1 through 210-$y$ (referred to herein as a "MEC 210" or "MECs 210"), and a UE 120.

Wireless network 105 may include any type of Public Land Mobile Network (PLMN) that provides wireless network service to UEs. In one implementation, wireless network 105 may include a hybrid Fourth Generation/Fifth Generation (4G/5G) wireless network that includes both 4G network components and 5G network components. For example, as depicted in FIG. 2, wireless network 105 may include a 5G stand-alone (SA) Radio Access Network (RAN) 215, and other 5G network components, such as a Session Management Function (SMF) 125, a User Plane Function (UPF) 225, and a PCF 100. Wireless network 105 may further include a 4G non-stand-alone (NSA) RAN 230, and other 4G network components, such as a Mobility Management Entity (MME) 235, a Serving Gateway (SGW) 240, and a PGW 130. PGW 130 and UPF 225 of wireless network 105 may each connect directly to MECs 210-1 through 210-$y$, or indirectly via PDN 205. Though only a single PGW 130 and UPF 225 are shown in FIG. 2, wireless network 105 may include multiple PGWs 130 and multiple UPFs 225.

PDN 205 may include any type packet-switched network that may be used to transport data and to interconnect with other networks and devices. For example, PDN 205 may include a wired and/or wireless local area network LAN, a wired and/or wireless wide area network (WAN), a metropolitan area network (MAN), an intranet, and/or the Internet. PDN 205 may interconnect with wireless network 105 and MECs 210.

MECs 210-1 through 210-$y$ may each include one or more devices networked together. MECs 210 may each include, for example, a secure gateway, a server, and/or an MEC hosting infrastructure that enable applications and services to be hosted near a particular geographic region to ensure low latency of traffic and services to that geographic region. Each of MECs 210 may be installed in close proximity to certain locations or venues, such as close to smart infrastructure or large-scale venues (e.g., a sporting or concert arena, a theme park, etc.). MECs 210 may host different types of applications and services that process traffic from UE 120.

UE 120 may include any type of electronic device having a wireless communication capability. In some embodiments, UE 120 may include a mobile wireless device. UE 120 may include, for example, a laptop, palmtop, desktop, or tablet computer; a personal digital assistant (PDA); a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user (not shown) may carry, use, administer, and/or operate UE 120.

In a 4G portion of wireless network 105, PGW 130 includes a network device, or a software function executed by a network device, that acts as a router and a gateway between network 105 and PDN 205. PGW 130 may forward session data received from UE 120 to PDN 205 towards destinations, and may forward session data received from sources in PDN 205 to a UE 120 connected to a 4G NSA RAN 230, and/or between MECs 210 and 4G NSA RAN 230. SGW 240 includes a network device, or a software function executed by a network device, that routes and forwards session data between PGW 130 and a 4G NSA RAN 230 serving the session's destination UE 120. As shown in FIG. 2, PGW 130 may include a control component, PGW-C 130-C, and a user plane component PGW-U 130-U. PGW-C 130-C may execute the control functions of the PGW 130 and PGW-U 130-U may execute the user plane functions of the PGW 130.

MME 235 includes a network device, or a software function executed by a network device, that acts as a control entity for the 4G portion of wireless network 105. MME 235 further provides UE 120 with mobility management and session management functions using, for example, Network Access Stratum (NAS) signaling. 4G NSA RAN 230 may provide wireless network access to UE 120 and may include, among other components, at least one base-band unit (BBU) and multiple remote radio heads (RRHs) for providing a radio communication interface to a UE 120 that subscribes to 4G wireless network service from network 105. A "base station" of 4G NSA RAN 230 of wireless network 105 may include a BBU connected to a RRH, and the RRH may connect to an antenna array of a tower of the base station.

In a 5G portion of wireless network 105, UPF 225 includes a network device, or a software function executed by a network device, that acts as a router and a gateway between network 105 and PDN 205 and/or MECs 210. UPF 225 may forward session data between PDN 205 and 5G SA RAN 215, or between MECs 210 and 5G SA RAN 215. The 5G portion of network 105 may include multiple UPFs 225 disposed at various geographic locations in network 105 (only a single UPF 225 is shown for purposes of simplicity). SMF 125 includes a network device, or a software function(s) executed by a network device, that performs session management, and selects and controls the UPF(s) 225 for data transfer. Though not shown in FIG. 2, the 5G portion of wireless network 105 may additionally include an Access and Mobility Management Function (AMF) that performs access authentication, authorization, and mobility management for UE 120.

5G SA RAN 215 may provide wireless network access to UE 120 and may include, among other components, at least one base-band unit (BBU) and multiple remote radio heads (RRHs) for providing a radio communication interface to a UE 120 that subscribes to 5G wireless network service from network 105. A "base station" of 5G SA RAN 215 of wireless network 105 may include a BBU connected to a RRH, and the RRH may connect to an antenna array of a tower of the base station.

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2. For example, though only a single UE 120 is shown, multiple UEs 120 may wirelessly connect with 4G NSA RAN 230 and/or 5G SA RAN 215 to send and/or receive data traffic.

Figure 3:
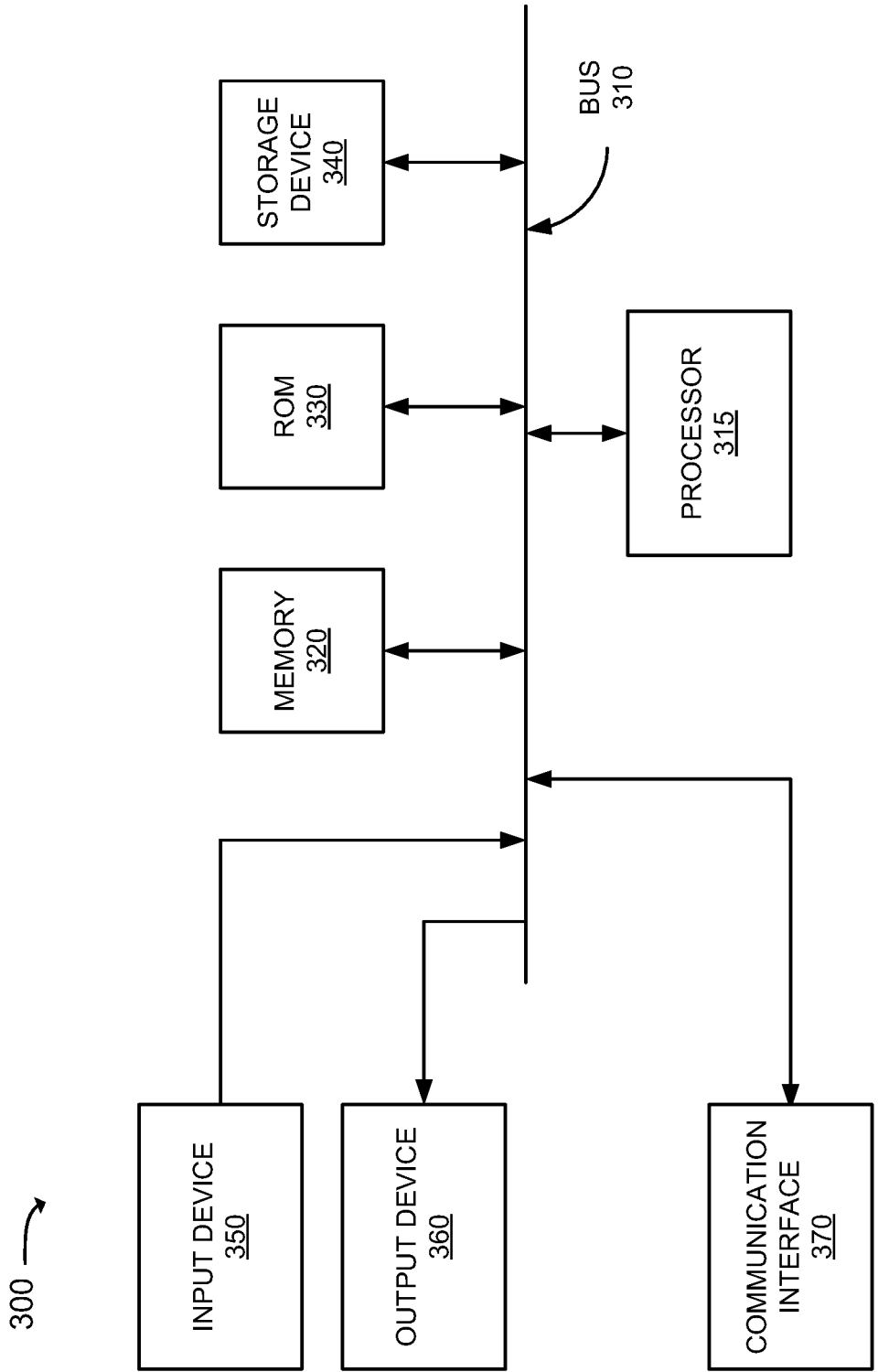
FIG. 3 is a diagram that depicts exemplary components of a device of FIG. 1 or 2.

FIG. 3 is a diagram that depicts exemplary components of a device 300. UE 120, MME 235, SMF 125, PGW 130 (i.e., PGW-C 130-C and PGW-U 130-U), PCF 100, UPF 225, SGW 240, and PGW 245 may be implemented by or on a same, or similar, components as device 300, and may be arranged in a same, or similar, configuration as device 300. MECs 210 may additionally each include one or more of devices 300 networked together. Device 300 may include a bus 310, a processor 315, a main memory 320, a read only memory (ROM) 330, a storage device 340, an input device 350, an output device 360, and a communication interface 370. Bus 310 may include a path that permits communication among the other components of device 300.

Processor 315 may include one or more processors or microprocessors which may interpret and execute stored instructions associated with one or more processes. Additionally, or alternatively, processor 315 may include processing logic that implements the one or more processes. For example, processor 315 may include programmable logic such as Field Programmable Gate Arrays (FPGAs), Graphic Processing Units (GPUs), or accelerators. Processor 315 may include software, hardware, or a combination of software and hardware for executing the processes described herein.

Main memory 320 may include a random access memory (RAM) or another type of dynamic storage device that may store information and, in some implementations, instructions for execution by processor 315. ROM 330 may include a ROM device or another type of static storage device (e.g., Electrically Erasable Programmable ROM (EEPROM)) that may store static information and, in some implementations, instructions for use by processor 315. Storage device 340 may include a magnetic, optical, and/or solid state (e.g., flash drive) recording medium and its corresponding drive. Main memory 320, ROM 330 and storage device 340 may each be referred to herein as a "non-transitory computer-readable medium" or a "non-transitory storage medium." The processes/methods set forth herein (or at least a portion of the processes/methods set forth herein) can be implemented as instructions that are stored in main memory 320, ROM 330 and/or storage device 340 for execution by processor 315 of a device 300.

Input device 350 may include one or more devices that permit an operator to input information to device 300, such as, for example, a keypad or a keyboard, a display with a touch sensitive panel, voice recognition and/or biometric mechanisms, etc. Output device 360 may include one or more devices that output information to the operator, including a display, a speaker, etc. Input device 350 and output device 360 may, in some implementations, be implemented as a user interface (UI), such as a touch screen display, that displays UI information, and which receives user input via the UI. Communication interface 370 may include one or more transceivers that enable device 300 to communicate with other devices and/or systems. For example, if device 300 is a UE 120, communication interface 370 may include a wireless transceiver for communicating via a wireless link with 4G RAN 230 and/or 5G RAN 215. As another example, if device 300 is a network device of a MEC 210, communication interface 370 may include a wired transceiver for communicating with another network device of MEC 210, with PDN 205, or with wireless network 105 (e.g., with PGW 130 or UPF 225).

Device 300 may perform certain operations or processes, as may be described herein. Device 300 may perform these operations in response to processor 315 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into main memory 320 from another computer-readable medium, such as storage device 340, or from another device via communication interface 370. The software instructions contained in main memory 320 may cause processor 315 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 300 illustrated in FIG. 3 is for illustrative purposes only. Other configurations may be implemented. Therefore, device 300 may include additional, fewer and/or different components, arranged in a different configuration, than depicted in FIG. 3. For example, device 300 may additionally include a Global Positioning System (GPS) unit or device that can determine a geographic location of device 300. Additionally, device 300 may include additional special purpose components, not shown in FIG. 3, that may operate together with the depicted components of device 300.

Figure 4:
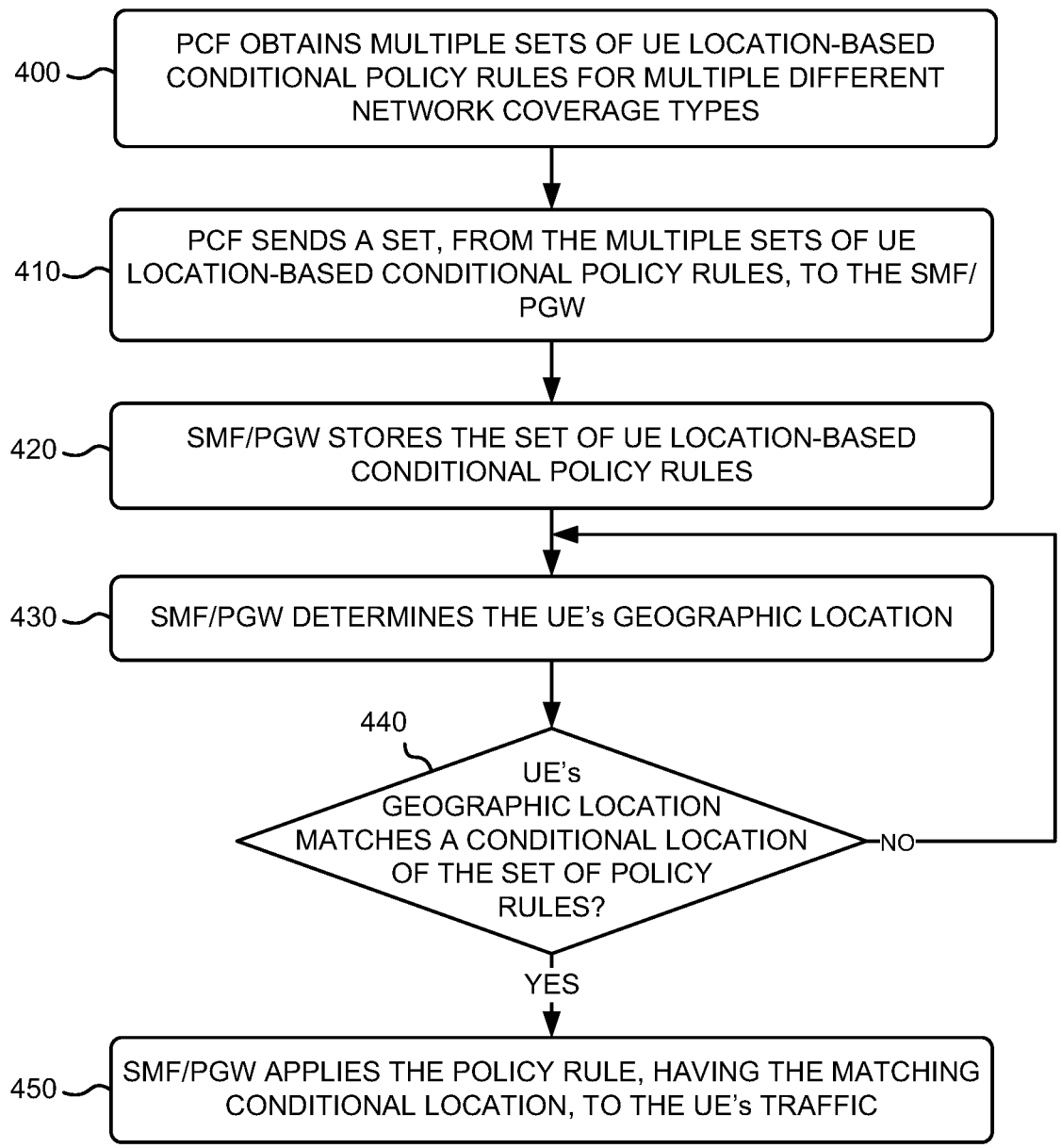
FIG. 4 is a flow diagram that illustrates an exemplary process for applying different conditional policy rules to traffic based on a geographic location of a UE.

FIG. 4 is a flow diagram that illustrates an exemplary process for applying different conditional policy rules to UE traffic based on a geographic location of the UE 120. The exemplary process of FIG. 4 may be implemented by PCF 100 in conjunction with SMF 125 and/or PGW 130. The process of FIG. 4 is described below with reference to the example signal/operations flow diagrams of FIGS. 5 and 6. Prior to execution of the process of FIG. 4, one or more conditional policy rule sets may be uploaded to PCF 100 for storage. In some implementations, a network administrator of wireless network 105 may generate the one or more condition policy rule sets and upload the rule sets to PCF 100.

The exemplary process includes PCF 100 obtaining multiple sets of UE location-based conditional policy rules (block 400) and sending a set of the multiple sets of UE location-based conditional policy rules to the SMF 125 and/or PGW 130 (block 410). PCF 100 may retrieve, from local memory, a previously stored set of UE location-based conditional policy rules. In some implementations, the previously stored sets of UE location-based conditional policy rules may be designated solely for use by a particular UE 120. In other implementations, the previously stored sets of UE location-based conditional policy rules may be designated for use by a group of UEs that includes the particular UE 120. PCF 100 may, for example, receive a device identifier (ID) for a UE 120 from SMF 125 or PGW 130, retrieve a subscriber profile that corresponds to the device ID, and then select a set of UE location-based policy rules based on the retrieved subscriber profile. PCF 100 then sends the selected set of policy rules to the SMF 125 and/or PGW 130. In some implementations, a node in wireless network 105 (e.g., MME 235, SMF 125, or PGW 130) may trigger PCF 100 to obtain the set of UE location-based conditional policy rules based on UE 120 powering up from a powered down state. In one example, the set(s) of UE located-based conditional policy rules may include policy rules that apply QoS rules to UE traffic based on a current geographic location of the UEs. In another example, the set(s) of UE location-based conditional policy rules may include policy rules that select MECs, from multiple MECs, for handling particular UE traffic based on a current geographic location of the UEs. Referring to the example of FIG. 5, PCF 100 obtains 505 multiple sets of UE location-based conditional policy rules for, and sends a message 510 to SMF 125/PGW-C 130-C that includes a selected set of the multiple sets of UE location-based conditional policy rules.

Figure 6:
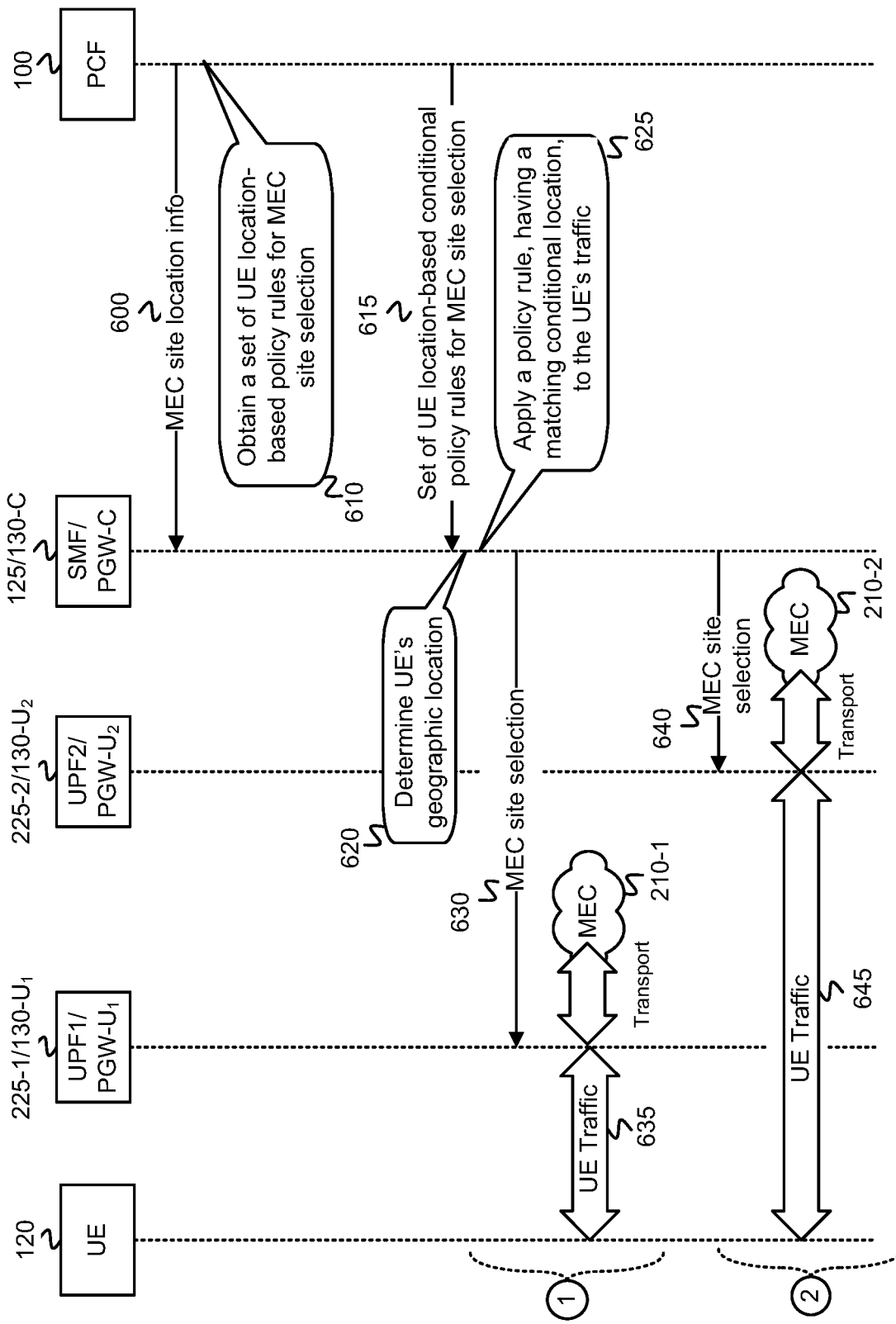

In an example in which UE location-based conditional policy rules are applied to select an MEC, from multiple MECs, for handling a UE 120's traffic, each MEC 210 (see FIG. 2) may be installed at a different geographic location relative to wireless network 105 and UE 120. For lower latency service, for example, a MEC 210 may be installed at a geographic location in close proximity to a certain venue (e.g., concert arena) or other high traffic location. When each MEC 210 is installed, the geographic location is noted (e.g., using GPS coordinates) and supplied to PCF 100, and possibly to other network nodes in wireless network 105. PCF 100, therefore, maintains a database of geographic locations for each of MECs 210-1 through 210-y. Referring to the example of FIG. 6 shows PCF 100 sending a message 600 to SMF 125/PGW 130 that includes MEC site location information for MECs 210. PCF 100 further obtains 610 a set of UE location-based policy rules for MEC site selection, and sends a message 615 that includes the set of UE location-based policy rules to SMF 125/PGW-C 130-C.

SMF 125 and/or PGW-C 130-C stores the received set of UE location-based conditional policy rules (block 420). Upon receipt from PCF 100 via wireless network 1095, SMF 125/PGW-C 130-C locally stores the received set of policy rules for subsequent retrieval for control of traffic to and from the UE 120. In the example in which UE location-based conditional policy rules are used to select a MEC from among multiple MECs, SMF 125/PGW-C 130-C stores the received MEC site location information and the set of UE location-based MEC site selection conditional policy rules. The set of UE location-based conditional policy rules may include, for example, rules that select a particular MEC site (or sites) based on a comparison of the UE 120's current geographic location and the MEC site locations so as to, for example, offload the UE's traffic to a MEC site(s) that provides a best level of service for the UE (e.g., a closest MEC site that provides the lowest latency). For example, a conditional policy rule may include a statement such as the following: if UE's current location satisfies a particular condition, then select MEC site X As a specific example, a conditional policy rule may include the following statement: if the UE's geographic location is within a distance Y of MEC site location X, then select MEC X for handling the UE's traffic. In some implementations, a node in wireless network 105 (e.g., MME 235, SMF 125, PGW 130) may trigger PCF 100 to obtain the multiple sets of UE location-based conditional policy rules based on UE 120 powering up from a powered down state.

SMF 125/PGW-C 130-C determines the UE 120's geographic location (block 430) and determines if the UE 120's geographic location matches a conditional location from the set of policy rules (block 440). In one implementation, SMF 125/PGW-C 130-C may identify the base station serving the UE 120 which may, in turn, be mapped to the base station's geographic location. In another implementation, SMF 125/PGW-C 130-C may obtain Global Positioning System (GPS) data from the UE 120 itself to identify the UE 120's precise geographic location. In a further implementation, SMF 125/PGW-C 130-C may identify the Presence Reporting Area (PRA) associated with the UE 120 to further identify whether the PRA is a 4G-only coverage area or a 5G coverage area. In an implementation in which SMF 125/PGW-C 130-C identifies the base station serving the UE 120, SMF 125/PGW-C 130-C further identifies whether the base station is located within 5G SA RAN 215 (i.e., a 5G coverage area) or 4G NSA RAN 230 (i.e., a 4G coverage area) to determine if the base station is within a 4G or a 5G coverage area. In an implementation in which SMF 125/PGW-C 130-C obtains the UE 120's GPS data to determine the UE 120's geographic location, SMF 125/PGW-C 130-C compares the GPS data with known 4G and 5G coverage boundaries to determine whether UE 120 is within a 4G or 5G coverage area.

If the UE 120's geographic location matches a conditional location of the set of policy rules, then SMF 125/PGW-C 130-C applies the policy rule, having the matching conditional location, to the UE 120's traffic (block 450). In an example in which QoS conditional policy rules may be selectively applied based on the UE 120's geographic location, a first QoS policy rule of the set of conditional policy rules may restrict the UE 120 to data transport at a first QoS level (e.g., video streaming with a lower video resolution, such as 720p) if the UE 120 is currently located at a geographic location that corresponds to a 4G coverage area; and a second QoS policy rule may permit the UE 120 to engage in data transport at a second, better QoS level (e.g., video streaming at a higher video resolution, such as 4K) if the UE 120 is currently located at a geographic location that corresponds to a 5G coverage area.

Figure 5:
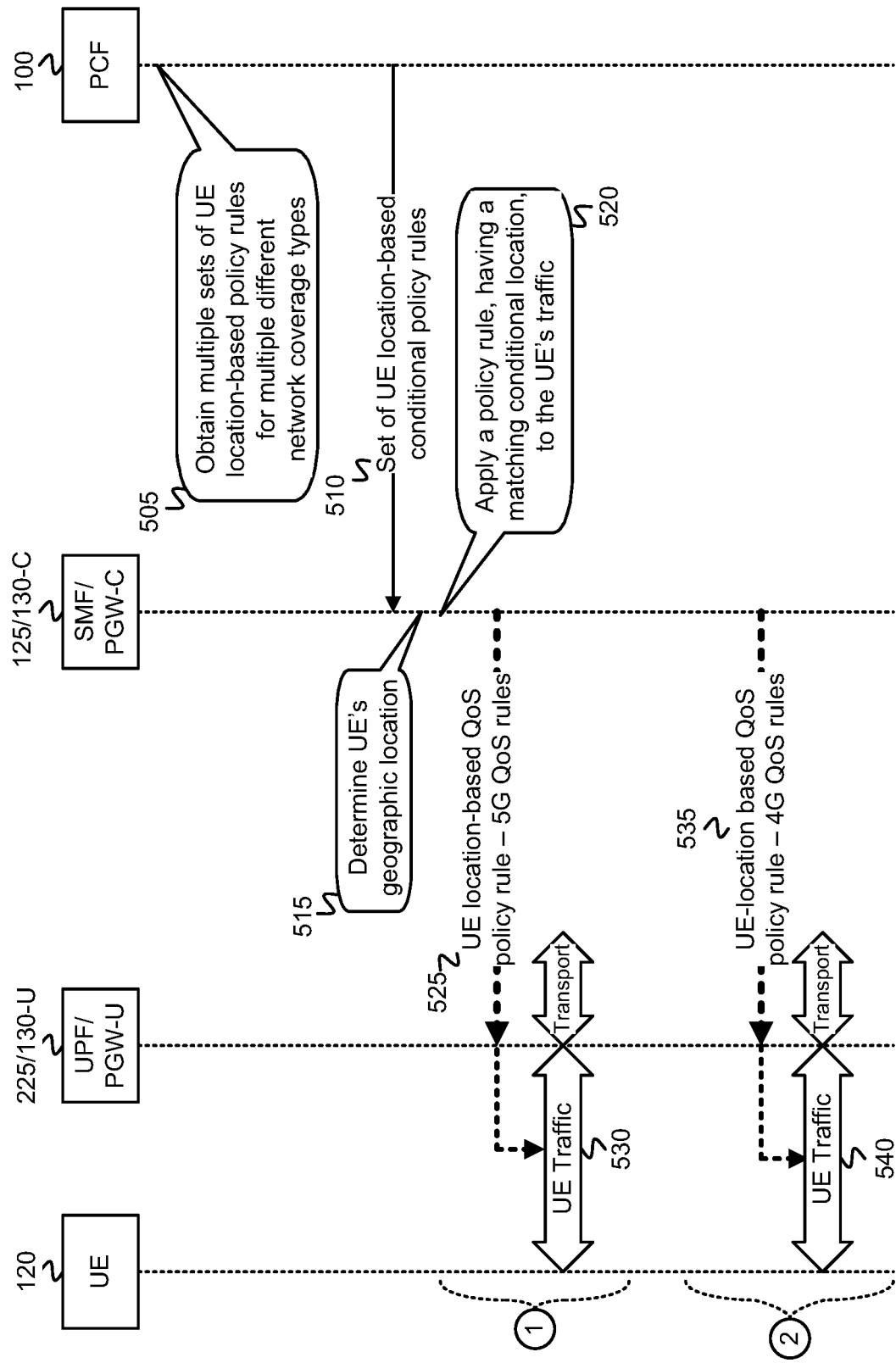
FIGS. 5 and 6 illustrate exemplary operations, messages, and data flows associated with the process of FIG. 4.

FIG. 5 depicts an example in which SMF 125/PGW-C 130-C determines 515 the UE 120's geographic location and applies 520 a policy rule, having a matching conditional location, to the UE 120's traffic. In a first circumstance where the UE 120 is located in a first geographic location corresponding to a 5G coverage area, then SMF 125/PGW-C 130-C applies a first QoS conditional policy rule 525, from multiple QoS rules, to the UE traffic 530 involved in transport. Application of the UE-location based QoS conditional policy rule 525 may include UPF 225/PGW-U 130-U, which is handling the UE 120's traffic, receiving the location-based QoS policy rule from SMF 125/PGW-C 130-C and applying the 5G-specific QoS permissions/restrictions of the QoS policy rule to the UE traffic 530. For example, UPF 225/PGW-U 130-U, in accordance with the UE-location based conditional policy rule 525, may enable the UE 120 to use high resolution video (e.g., 4K video resolution) when streaming video within the UE 120's traffic 530.

In a second circumstance where the UE 120 is located in a geographic location corresponding to a 4G coverage area, then SMF 125/PGW-C 130-C 130 applies a second QoS conditional policy rule 535, from the multiple QoS rules, to the UE traffic 540 involved in transport. Application of the UE-location based QoS conditional policy rule 535 may include UPF 225/PGW-U 130-U, which is handling the UE 120's traffic, receiving the location-based QoS policy rule from SMF 125/PGW-C 130-C and applying the 4G-specific QoS permissions/restrictions of the QoS policy rule to the UE traffic 540. For example, UPF 225/PGW-U 130-U, in accordance with the UE-location based QoS conditional policy rule 535, may restrict the UE 120 to use of a lower video resolution (e.g., 720p video resolution) when streaming video within the UE 120's traffic 540.

In a simplified example in which two MECs, MEC 1 and MEC 2, are connected to wireless network 105, SMF 125/PGW 130 may use the UE 120's geographic location in conjunction with the set of conditional policy rules to select either MEC 1 or MEC 2 for handling the traffic to and/or from a UE 120. In this simplified example, the set of conditional policy rules may include the following two conditional policy rules:

1) if the UE's geographic location is within a distance $Y_1$ of MEC 1's site location $X_1$, then select MEC 1 for handling the UE's traffic; and 2) if the UE's geographic location is within a distance $Y_2$ of MEC 2's site location $X_2$, then select MEC 2.

Application of the two conditional policy rules, in this simplified example, results in selection of either MEC 1 or MEC 2 for handling the traffic from the UE 120. SMF 125/PGW-C 130-C's use of a set of conditional policy rules enables the selection of a MEC that provides the best performance (e.g., lowest latency) for traffic to and from the UE 120. Also, as the UE 120 moves within wireless network 105, the exemplary process of FIG. 4 enables re-selection of a MEC 210 for handling traffic to and from the moving UE 120. Thus, as the UE 120 moves within wireless network 105, the UE 120's traffic may be offloaded from a first MEC to a second MEC that can provide a better performance, such as a better latency. Though only 2 MECs are described above, wireless network 105 may connect to numerous MECs (e.g., three or more), and the set of conditional policy rules may include policy rules for selecting a MEC of the numerous MECs based on a geographic location of the UEs.

FIG. 6 shows examples of SMF 125/PGW-C 130-C determining 620 the UE 120's geographic location and applying 625 a policy rule, having a matching conditional location, to the UE's traffic for MEC site selection. In a first circumstance, where the UE 120 is located at a first geographic location in wireless network 105, SMF 125/PGW-C 130-C, subsequent to identifying a MEC selection policy rule of the set of MEC selection policy rules that has a conditional location that matches the UE 120's current geographic location, determines the selected MEC (e.g., MEC 210-1 in FIG. 6) from the identified MEC selection policy rule. SMF 125/PGW-C 130-C further selects a first UPF 225-1/PGW-U$_1$ 130-U$_1$, from multiple UPFs/PGW-Us within wireless network 105, to handle transporting UE 120's traffic to/from the selected MEC. SMF 125/PGW-C 130-C then sends a message 630 that includes data identifying the selected MEC site (MEC 210-1 in FIG. 6) to the selected UPF 225-1/PGW-U$_1$ 130-U$_1$. Upon receipt of message 630, UPF 225-1/PGW-U$_1$ 130-U$_1$ routes the UE's data traffic 635 to/from the MEC 210-1 indicated by the received message 630.

In a second circumstance, where the UE 120 is located at a second geographic location in wireless network 105, SMF 125/PGW-C 130-C, subsequent to identifying a MEC selection policy rule of the set of MEC selection policy rules that has a conditional location that matches the UE 120's current geographic location, determines the selected MEC (e.g., MEC 210-2 in FIG. 6) from the identified MEC selection policy rule. SMF 125/PGW-C 130-C further selects a second UPF 225-2/PGW-U$_2$ 130-U$_2$, from the multiple UPFs/PGW-Us within wireless network 105, to handle transporting UE 120's traffic to/from the selected MEC. SMF 125/PGW-C 130-C then sends a message 640 that includes data identifying the selected MEC site (MEC 210-2 in FIG. 6) to the selected UPF 225-2/PGW-U$_2$ 130-U$_2$. Upon receipt of message 640, UPF 225-2/PGW-U$_2$ 130-U$_2$ routes the UE's data traffic 645 to/from the MEC 210-2 indicated by the received message 640.

In some implementations, the exemplary process of FIG. 4 may be repeated each time a UE 120 powers up from a powered down condition. Furthermore, blocks 430-450 of FIG. 4 may be selectively repeated to identify a current geographic location of the UE 120 and to apply conditional policy rules (e.g., for UE location-specific QoS control or MEC selection) as the UE 120's current geographic location changes within wireless network 105.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 4, and a sequence of operations, messages, and/or data flows with respect to FIGS. 5 and 6, the order of the blocks and/or the operations, messages, and data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 415) of a device. A non-transitory storage medium includes one or more of the storage mediums described in relation to memory/storage 420. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, from a policy control function (PCF), at least one set of a plurality of user equipment device (UE)-location based conditional policy rules;
   selecting a first one of the plurality of UE-location based conditional policy rules based on a first geographic location of a first UE; and
   applying the selected first one of the plurality of UE-location based conditional policy rules to control a Quality of Service (QoS) level associated with transport of data traffic of the first UE, or to select a multi-access edge computing data center (MEC) from multiple MECs for handling the data traffic of the first UE.

2. The method of claim 1, wherein each of the plurality of UE-location based conditional policy rules comprises a conditional rule that controls, or applies a network function or action to, the data traffic associated with the first UE based on the first geographic location of the first UE.

3. The method of claim 1, further comprising:
   selecting a second one of the plurality of UE-location based conditional policy rules based on a second geographic location of a second UE; and
   applying the selected second one of the plurality of UE-location based conditional policy rules to control a QoS level associated with transport of data traffic of the second UE, or to select an MEC from multiple MECs for handling the data traffic of the second UE.

4. The method of claim 1, wherein receiving the at least one set of a plurality of UE-location based conditional policy rules is performed by a session management function (SMF) or a packet data network gateway (PGW) in a network.

5. The method of claim 1, wherein the plurality of UE-location based conditional policy rules comprises a plurality of quality of service (QoS) rules, and wherein selecting the first one of the plurality of UE-location based conditional policy rules further comprises:
   selecting a first QoS rule, from the plurality of QoS rules, to control the QoS level associated with the transport of the data traffic of the first UE if the first geographic location comprises a first location; and
   selecting a second QoS rule, from the plurality of QoS rules, to control the QoS level associated with the transport of the data traffic of the first UE if the first geographic location comprises a second location that is different than the first location.

6. The method of claim 5, wherein the first location comprises a Fourth Generation (4G) wireless network coverage area and wherein the second location comprises a Fifth Generation (5G) wireless network coverage area.

7. The method of claim 1, further comprising:
receiving geographic location information associated with each of the multiple MECs,
wherein applying the selected first one of the plurality of UE-location based conditional policy rules to select the MEC further comprises:
selecting the MEC from the multiple MECs based on the first geographic location of the first UE and the geographic location information associated with each of the multiple MECs.

8. The method of claim 1, wherein selecting the first one of the plurality of UE-location based conditional policy rules further comprises:
selecting a first MEC selection rule to further select the MEC from the multiple MECs if the first geographic location of the first UE comprises a first geographic location or a first geographic area; and
selecting a second MEC selection rule to further select a second MEC from the multiple MECs if the first geographic location of the first UE comprises a second geographic location or a second geographic area.

9. The method of claim 1, wherein the plurality of UE-location based conditional policy rules comprise at least one of QoS policy rules that apply a particular QoS level to the transport of the data traffic of the first UE based on the first geographic location of the first UE, or multi-access edge computing data center (MEC) selection policy rules that select the MEC from the multiple MECs for handling the data traffic of the first UE based on the first geographic location of the first UE.

10. A network device, comprising:
at least one communication interface configured to receive, from a policy control function (PCF), at least one set of a plurality of user equipment device (UE)-location based conditional policy rules; and
a processor or logic configured to:
select a first one of the plurality of UE-location based conditional policy rules based on a first geographic location of a first UE, and
apply the selected first one of the plurality of UE-location based conditional policy rules to control a Quality of Service (QoS) level associated with transport of data traffic of the first UE, or to select a multi-access edge computing data center (MEC) from multiple MECs for handling the data traffic of the first UE.

11. The network device of claim 10, wherein the processor or logic is further configured to:
select a second one of the plurality of UE-location based conditional policy rules based on a second geographic location of a second UE, and
apply the selected second one of the plurality of UE-location based conditional policy rules to control a QoS level associated with transport of data traffic of the second UE, or to select an MEC from multiple MECs for handling the data traffic of the second UE.

12. The network device of claim 10, wherein the network device implements a session management function (SMF) or a packet data network gateway (PGW) in a network.

13. The network device of claim 10, wherein the plurality of UE-location based conditional policy rules comprises a plurality of quality of service (QoS) rules, and wherein, when selecting the first one of the plurality of UE-location based conditional policy rules, the processor or logic is further configured to:
select a first QoS rule, from the plurality of QoS rules, to control the QoS level associated with the transport of the data traffic of the first UE if the first geographic location comprises a first location, and
select a second QoS rule, from the plurality of QoS rules, to control the QoS level associated with the transport of the data traffic of the first UE if the first geographic location comprises a second location that is different than the first location.

14. The network device of claim 13, wherein the first location comprises a Fourth Generation (4G) wireless network coverage area and wherein the second location comprises a Fifth Generation (5G) wireless network coverage area.

15. The network device of claim 10, wherein the at least one communication interface is further configured to receive geographic location information associated with each of the multiple MECs,
wherein, when applying the selected first one of the plurality of UE-location based conditional policy rules to select the MEC, the processor logic is further configured to:
select the MEC from the multiple MECs based on the first geographic location of the first UE and the geographic location information associated with each of the multiple MECs.

16. The network device of claim 10, wherein, when selecting the first one of the plurality of UE-location based conditional policy rules, the processor or logic is further configured to:
select a first MEC selection rule to further select the MEC from the multiple MECs if the first geographic location of the first UE comprises a first geographic location or a first geographic area, and
select a second MEC selection rule to further select a second MEC from the multiple MECs if the first geographic location of the first UE comprises a second geographic location or a second geographic area.

17. The network device of claim 10, wherein the plurality of UE-location based conditional policy rules comprise at least one of QoS policy rules that apply a particular QoS level to the transport of the data traffic of the first UE based on the first geographic location of the first UE, or multi-access edge computing data center (MEC) selection policy rules that select the MEC from the multiple MECs for handling the data traffic of the first UE based on the first geographic location of the first UE.

18. A non-transitory storage medium storing instructions executable by a network device with one or more processors, wherein execution of the instructions cause the network device to:
receive, from a policy control function (PCF), at least one set of a plurality of user equipment device (UE)-location based conditional policy rules;
select a first one of the plurality of UE-location based conditional policy rules based on a first geographic location of a first UE; and
apply the selected first one of the plurality of UE-location based conditional policy rules to control a Quality of Service (QoS) level associated with transport of data traffic of the first UE, or to select a multi-access edge computing data center (MEC) from multiple MECs for handling the data traffic of the first UE.

19. The non-transitory storage medium of claim 18, wherein the plurality of UE-location based conditional policy rules comprises a plurality of quality of service (QoS) rules, and wherein execution of the instructions to cause the network device to select the first one of the plurality of UE-location based conditional policy rules further causes the network device to:
- select a first QoS rule, from the plurality of QoS rules, to control the QoS level associated with the transport of the data traffic of the first UE if the first geographic location comprises a first location; and
- select a second QoS rule, from the plurality of QoS rules, to control the QoS level associated with the transport of the data traffic of the first UE if the first geographic location comprises a second location that is different than the first location.

20. The non-transitory storage medium of claim 18, wherein execution of the instructions to cause the network device to select the first one of the plurality of UE-location based conditional policy rules further causes the network device to:
- select a first MEC selection rule to further select the MEC from the multiple MECs if the first geographic location of the first UE comprises a first geographic location or a first geographic area; and
- select a second MEC selection rule to further select a second MEC from the multiple MECs if the first geographic location of the first UE comprises a second geographic location or a second geographic area.

\* \* \* \* \*